Patented Oct. 1, 1929

1,729,775

UNITED STATES PATENT OFFICE

WILLIAM J. HALE AND GEORGE H. CHENEY, OF MIDLAND, MICHIGAN, ASSIGNORS TO THE DOW CHEMICAL COMPANY, OF MIDLAND, MICHIGAN, A CORPORATION OF MICHIGAN

PROCESS FOR MAKING HALOGENATED ANILINES

No Drawing. Application filed August 23, 1926, Serial No. 131,107. Renewed July 26, 1928.

This invention relates to the preparation of halogenated amino compounds, and more particularly halogenated arylamines. Halogenated arylamines have heretofore usually been prepared by treating aniline with the halogen desired to be incorporated, or by reducing a nitro derivative of halogenated benzene. Both of these processes involve difficulties in operation and control. A procedure of reliable character giving good yields is accordingly highly desirable.

To the accomplishment of the foregoing and related ends, the invention, then, consists of the features hereinafter fully described, and particularly pointed out in the claims, the following description setting forth but few of various ways in which the principle of the invention may be used.

In accordance with our invention, a polyhalogenated hydrocarbon of the benzene series is treated with anhydrous ammonia, in a suitable non-aqueous medium, heat being applied as necessary to further the reaction, and a catalyst is advantageously present.

The following is given as an illustrative example of the procedure involved in carrying out our improved process, using dichlorbenzene:—Dichlorbenzene and ammonia in alcoholic medium in the proportions of one molecule of dichlorbenzene to three molecules of anhydrous ammonia are heated at a temperature of 150° to 250° C., preferably about 200° C., in the presence of about 1/10 molecule of cuprous chloride, together with metallic copper. For the purpose of securing the presence of the latter, the heating may be carried on in a copper autoclave or tubular system, or metallic copper may be provided in the heating receptacle where the latter is of another material.

Mixtures of polyhalogenated benzenes may be treated, and made to yield mixtures of halogenated anilines which can be separated. Ortho-dichlorbenzene yields ortho-chloraniline, and para-dichlorbenzene yields para-chloraniline. Homologues of benzene, for example dichlortoluene yields chlortoluidine.

As catalyst, copper in the form of some compound gives best results, the cuprous compounds and particularly cuprous chloride or oxide being most desirable. Metallic copper in addition exercises a promotive function and is thus found to decidedly accentuate catalytic action, but the presence of metallic copper is not essential in all cases. As catalyst also, the sludges from the reaction, such sludge containing copper in a form more or less difficult to identify, may also be used.

Other modes of applying the principle of the invention may be used, change being made as regards the features described, provided the steps stated in any of the following claims or the equivalent of such stated steps be employed.

We therefore particularly point out and distinctly claim as our invention:—

1. In a process of making a halogenated arylamine, the step which consists in reacting between a polyhalogenated aromatic hydrocarbon and anhydrous ammonia in the presence of a copper compound.

2. In a process of making a halogenated arylamine, the step which consists in reacting between a polyhalogenated aromatic hydrocarbon and anhydrous ammonia in the presence of cuprous chloride.

3. In a process of making a halogenated arylamine, the step which consists in reacting between a polyhalogenated aromatic hydrocarbon and anhydrous ammonia in the presence of a copper compound and metallic copper.

4. In a process of making a halogenated arylamine, the step which consists in reacting between a polyhalogenated aromatic hydrocarbon and anhydrous ammonia in the presence of cuprous chloride and metallic copper.

5. In a process of making orthochloraniline, the step which consists in reacting between orthodichlorbenzene and anhydrous ammonia in the presence of a copper compound.

6. In a process of making orthochloraniline, the step which consists in reacting between orthodichlorbenzene and anhydrous ammonia in the presence of cuprous chloride.

7. In a process of making orthochloraniline, the step which consists in reacting between orthodichlorbenzene and anhydrous ammonia in the presence of a copper compound and metallic copper.

8. In a process of making orthochloraniline, the step which consists in reacting between orthodichlorbenzene and anhydrous ammonia in the presence of cuprous chloride and metallic copper.

9. In a process of making orthochloraniline, the step which consists in heating orthodichlorbenzene and anhydrous ammonia at 150° to 250° C. in the presence of a copper compound.

10. In a process of making orthochloraniline, the step which consists in heating orthodichlorbenzene and anhydrous ammonia at 150° to 250° C. in the presence of cuprous chloride.

11. In a process of making orthochloraniline, the step which consists in heating orthodichlorbenzene and anhydrous ammonia at 150° to 250° C. in the presence of a copper compound and metallic copper.

12. In a process of making orthochloraniline, the step which consists in heating orthodichlorbenzene and anhydrous ammonia at 150° to 250° C. in the presence of cuprous chloride and metallic copper.

13. In a process of making a halogenated arylamine, the step which consists in heating a polyhalogenated aromatic hydrocarbon and ammonia in an alcoholic medium, in the presence of a copper compound.

14. In a process of making a halogenated arylamine, the step which consists in heating a polyhalogenated aromatic hydrocarbon and ammonia in an alcoholic medium, in the presence of a copper compound and metallic copper.

15. In a process of making ortho-chloraniline, the step which consists in heating orthodichlorbenzene and ammonia in an alcoholic medium, in the presence of a copper compound.

16. In a process of making ortho-chloraniline, the step which consists in heating orthodichlorbenzene and ammonia in an alcoholic medium, in the presence of a copper compound and metallic copper.

Signed by us this 20th day of August, 1926.

WILLIAM J. HALE.
GEORGE H. CHENEY.